(12) United States Patent
Muller et al.

(10) Patent No.: US 10,686,902 B2
(45) Date of Patent: Jun. 16, 2020

(54) SYSTEM AND METHOD FOR A MULTI-CHANNEL NOTIFICATION SERVICE

(71) Applicant: Twilio, Inc., San Francisco, CA (US)

(72) Inventors: Viktor Muller, London (GB); Devid Liik, Tallinn (EE); Sergei Zolotarjov, Tallinn (EE); Sergei Voronichev, Tallinn (EE); Artyom Tyazhelov, Tallinn (EE)

(73) Assignee: Twilio Inc., San Francisco, CA (US)

( * ) Notice: Subject to any disclaimer, the term of this patent is extended or adjusted under 35 U.S.C. 154(b) by 384 days.

(21) Appl. No.: 15/602,753

(22) Filed: May 23, 2017

(65) Prior Publication Data
US 2017/0339240 A1   Nov. 23, 2017

Related U.S. Application Data

(60) Provisional application No. 62/340,151, filed on May 23, 2016.

(51) Int. Cl.
G06F 15/16      (2006.01)
H04L 29/08      (2006.01)
(Continued)

(52) U.S. Cl.
CPC ........ *H04L 67/26* (2013.01); *H04M 3/42238* (2013.01); *H04M 3/42382* (2013.01); *H04W 4/14* (2013.01); *H04M 2203/2044* (2013.01)

(58) Field of Classification Search
CPC ............. H04L 67/26; H04M 3/42238; H04M 3/42382; H04M 2203/2044; H04W 4/14
See application file for complete search history.

(56) References Cited

U.S. PATENT DOCUMENTS 5,274,700 A   12/1993   Gechter et al.
5,526,416 A    6/1996   Dezonno et al.
(Continued)

FOREIGN PATENT DOCUMENTS

DE    1684587 A    3/1971
EP    0282126 A    9/1988
(Continued)

OTHER PUBLICATIONS

"Ethernet to Token ring Bridge"—Black Box Corporation, Oct. 1999 http://blackboxcanada.com/resource/files/productdetails/17044.pdf.
(Continued)

*Primary Examiner* — Richard G Keehn
(74) *Attorney, Agent, or Firm* — Schwegman Lundberg & Woessner, P.A.

(57) ABSTRACT

A system and method for multichannel notifications that includes configuring an account for notifications within a multitenant platform for multi-channel notifications, which further includes receiving configuration for a set of participant binding resources, wherein the set of participant binding resources comprises endpoint addressing resources, where an endpoint addressing resource specifies a communication address and a communication channel identifier; receiving a notification request on behalf of an account, the notification request comprising at least one targeting property; and executing notifications in accordance to the notification request and the configuration of the participant binding resources of the account by selecting endpoint addressing resources that are accessed from the participant binding resources using the targeting properties of the notification request and transmitting notifications to communication addresses over a set of different communication
(Continued)

channels as indicated by the selected endpoint addressing resources.

20 Claims, 6 Drawing Sheets

(51) Int. Cl.
    *H04W 4/14* (2009.01)
    *H04M 3/42* (2006.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,487,566 B1 * | 11/2002 | Sundaresan .......... G06F 17/227 715/235 |
| 6,493,558 B1 | 12/2002 | Bernhart et al. |
| 6,496,500 B2 | 12/2002 | Johnson et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Chun et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |

(56) References Cited

U.S. PATENT DOCUMENTS

| | | |
|---|---|---|
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Francis et al. |
| 8,819,133 B2 | 8/2014 | Wang |
| 8,825,746 B2 | 9/2014 | Ravichandran |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack |
| 9,141,682 B1 | 9/2015 | Adoc, Jr. et al. |
| 9,161,296 B2 | 10/2015 | Parsons et al. |
| 9,204,281 B2 | 12/2015 | Ramprasad et al. |
| 9,306,982 B2 | 4/2016 | Lawson et al. |
| 9,307,094 B2 | 4/2016 | Nowack et al. |
| 9,325,624 B2 | 4/2016 | Malatack et al. |

(56) References Cited

U.S. PATENT DOCUMENTS

| | | | |
|---|---|---|---|
| 9,338,190 B2 | 5/2016 | Eng et al. | |
| 9,344,573 B2 | 5/2016 | Wolthuis | |
| 9,378,337 B2 | 6/2016 | Kuhr | |
| 9,456,008 B2 | 9/2016 | Lawson et al. | |
| 9,456,339 B1 | 9/2016 | Hildner et al. | |
| 9,584,462 B1* | 2/2017 | Chen | H04L 51/30 |
| 9,596,274 B2 | 3/2017 | Lawson et al. | |
| 9,628,624 B2 | 4/2017 | Wolthuis et al. | |
| 9,632,875 B2 | 4/2017 | Raichstein et al. | |
| 9,967,319 B2* | 5/2018 | Savelieva | H04L 63/0428 |
| 2001/0038624 A1 | 11/2001 | Greenberg et al. | |
| 2001/0043684 A1 | 11/2001 | Guedalia et al. | |
| 2001/0051996 A1 | 12/2001 | Cooper et al. | |
| 2002/0006124 A1 | 1/2002 | Jimenez et al. | |
| 2002/0006125 A1 | 1/2002 | Josse et al. | |
| 2002/0006193 A1 | 1/2002 | Rodenbusch et al. | |
| 2002/0025819 A1 | 2/2002 | Cetusic et al. | |
| 2002/0057777 A1 | 5/2002 | Saito et al. | |
| 2002/0064267 A1 | 5/2002 | Martin et al. | |
| 2002/0067823 A1 | 6/2002 | Walker et al. | |
| 2002/0077833 A1 | 6/2002 | Arons et al. | |
| 2002/0126813 A1 | 9/2002 | Partovi et al. | |
| 2002/0133587 A1 | 9/2002 | Ensel et al. | |
| 2002/0136391 A1 | 9/2002 | Armstrong | |
| 2002/0165957 A1 | 11/2002 | Devoe et al. | |
| 2002/0176378 A1 | 11/2002 | Hamilton et al. | |
| 2002/0176404 A1 | 11/2002 | Girard | |
| 2002/0184361 A1 | 12/2002 | Eden | |
| 2002/0198941 A1 | 12/2002 | Gavrilescu et al. | |
| 2003/0006137 A1 | 1/2003 | Wei et al. | |
| 2003/0012356 A1 | 1/2003 | Zino et al. | |
| 2003/0014665 A1 | 1/2003 | Anderson et al. | |
| 2003/0018830 A1 | 1/2003 | Chen et al. | |
| 2003/0023672 A1 | 1/2003 | Vaysman | |
| 2003/0026426 A1 | 2/2003 | Wright | |
| 2003/0046366 A1 | 3/2003 | Pardikar et al. | |
| 2003/0051037 A1 | 3/2003 | Sundaram et al. | |
| 2003/0058884 A1 | 3/2003 | Kallner et al. | |
| 2003/0059020 A1 | 3/2003 | Meyerson et al. | |
| 2003/0060188 A1 | 3/2003 | Gidron et al. | |
| 2003/0061317 A1 | 3/2003 | Brown et al. | |
| 2003/0061404 A1 | 3/2003 | Atwal | |
| 2003/0088421 A1 | 5/2003 | Maes et al. | |
| 2003/0097330 A1 | 5/2003 | Hillmer et al. | |
| 2003/0097447 A1 | 5/2003 | Johnston | |
| 2003/0097639 A1 | 5/2003 | Niyogi et al. | |
| 2003/0103620 A1 | 6/2003 | Brown et al. | |
| 2003/0123640 A1 | 7/2003 | Roelle et al. | |
| 2003/0149721 A1 | 8/2003 | Alfonso-Nogueiro et al. | |
| 2003/0162506 A1 | 8/2003 | Toshimitsu et al. | |
| 2003/0195950 A1 | 10/2003 | Huang et al. | |
| 2003/0195990 A1 | 10/2003 | Greenblat | |
| 2003/0196076 A1 | 10/2003 | Zabarski et al. | |
| 2003/0204616 A1 | 10/2003 | Billhartz et al. | |
| 2003/0211842 A1 | 11/2003 | Kempf et al. | |
| 2003/0231647 A1 | 12/2003 | Petrovykh | |
| 2003/0233276 A1 | 12/2003 | Pearlman et al. | |
| 2004/0008635 A1 | 1/2004 | Nelson et al. | |
| 2004/0011690 A1 | 1/2004 | Marfino et al. | |
| 2004/0044953 A1 | 3/2004 | Watkins et al. | |
| 2004/0052349 A1 | 3/2004 | Creamer et al. | |
| 2004/0071275 A1 | 4/2004 | Bowater et al. | |
| 2004/0101122 A1 | 5/2004 | Da Palma | |
| 2004/0102182 A1 | 5/2004 | Reith et al. | |
| 2004/0117788 A1 | 6/2004 | Karaoguz et al. | |
| 2004/0136324 A1 | 7/2004 | Steinberg | |
| 2004/0165569 A1 | 8/2004 | Sweatman et al. | |
| 2004/0172482 A1 | 9/2004 | Weissman et al. | |
| 2004/0199572 A1 | 10/2004 | Hunt et al. | |
| 2004/0205101 A1 | 10/2004 | Radhakrishnan | |
| 2004/0205689 A1 | 10/2004 | Ellens et al. | |
| 2004/0213400 A1 | 10/2004 | Golitsin et al. | |
| 2004/0216058 A1 | 10/2004 | Chavers et al. | |
| 2004/0218748 A1 | 11/2004 | Fisher | |
| 2004/0228469 A1 | 11/2004 | Andrews et al. | |
| 2004/0236696 A1 | 11/2004 | Aoki et al. | |
| 2004/0240649 A1 | 12/2004 | Goel | |
| 2005/0005109 A1 | 1/2005 | Castaldi et al. | |
| 2005/0005200 A1 | 1/2005 | Matena et al. | |
| 2005/0010483 A1 | 1/2005 | Ling | |
| 2005/0015505 A1 | 1/2005 | Kruis et al. | |
| 2005/0021626 A1 | 1/2005 | Prajapat et al. | |
| 2005/0025303 A1 | 2/2005 | Hostetler | |
| 2005/0038772 A1 | 2/2005 | Colrain | |
| 2005/0043952 A1 | 2/2005 | Sharma et al. | |
| 2005/0047579 A1 | 3/2005 | Salame | |
| 2005/0060411 A1 | 3/2005 | Coulombe et al. | |
| 2005/0083907 A1 | 4/2005 | Fishler | |
| 2005/0091336 A1 | 4/2005 | DeHamer et al. | |
| 2005/0091572 A1 | 4/2005 | Gavrilescu et al. | |
| 2005/0108770 A1 | 5/2005 | Karaoguz et al. | |
| 2005/0125251 A1 | 6/2005 | Berger et al. | |
| 2005/0125739 A1 | 6/2005 | Thompson et al. | |
| 2005/0128961 A1 | 6/2005 | Miloslavsky et al. | |
| 2005/0135578 A1 | 6/2005 | Ress et al. | |
| 2005/0141500 A1 | 6/2005 | Bhandari et al. | |
| 2005/0147088 A1 | 7/2005 | Bao et al. | |
| 2005/0177635 A1 | 8/2005 | Schmidt | |
| 2005/0181835 A1 | 8/2005 | Lau et al. | |
| 2005/0198292 A1 | 9/2005 | Duursma et al. | |
| 2005/0228680 A1 | 10/2005 | Malik | |
| 2005/0238153 A1 | 10/2005 | Chevalier | |
| 2005/0240659 A1 | 10/2005 | Taylor | |
| 2005/0243977 A1 | 11/2005 | Creamer et al. | |
| 2005/0246176 A1 | 11/2005 | Creamer et al. | |
| 2005/0286496 A1 | 12/2005 | Malhotra | |
| 2005/0289222 A1 | 12/2005 | Sahim | |
| 2006/0008065 A1 | 1/2006 | Longman et al. | |
| 2006/0008073 A1 | 1/2006 | Yoshizawa et al. | |
| 2006/0008256 A1 | 1/2006 | Khedouri et al. | |
| 2006/0015467 A1 | 1/2006 | Morken et al. | |
| 2006/0021004 A1 | 1/2006 | Moran et al. | |
| 2006/0023676 A1 | 2/2006 | Whitmore et al. | |
| 2006/0047666 A1 | 3/2006 | Bedi et al. | |
| 2006/0067506 A1 | 3/2006 | Flockhart et al. | |
| 2006/0080415 A1 | 4/2006 | Tu | |
| 2006/0098624 A1 | 5/2006 | Morgan et al. | |
| 2006/0129638 A1 | 6/2006 | Deakin | |
| 2006/0143007 A1 | 6/2006 | Koh et al. | |
| 2006/0146792 A1 | 7/2006 | Ramachandran et al. | |
| 2006/0146802 A1 | 7/2006 | Baldwin | |
| 2006/0168334 A1 | 7/2006 | Potti et al. | |
| 2006/0203979 A1 | 9/2006 | Jennings | |
| 2006/0209695 A1 | 9/2006 | Archer et al. | |
| 2006/0212865 A1 | 9/2006 | Vincent et al. | |
| 2006/0215824 A1 | 9/2006 | Mitby et al. | |
| 2006/0217823 A1 | 9/2006 | Hussey | |
| 2006/0217978 A1 | 9/2006 | Mitby et al. | |
| 2006/0222166 A1 | 10/2006 | Ramakrishna et al. | |
| 2006/0235715 A1 | 10/2006 | Abrams | |
| 2006/0256816 A1 | 11/2006 | Yarlagadda et al. | |
| 2006/0262915 A1 | 11/2006 | Marascio et al. | |
| 2006/0270386 A1 | 11/2006 | Yu et al. | |
| 2006/0285489 A1 | 12/2006 | Francisco et al. | |
| 2007/0002744 A1 | 1/2007 | Mewhinney et al. | |
| 2007/0036143 A1 | 2/2007 | Alt et al. | |
| 2007/0038499 A1 | 2/2007 | Margulies et al. | |
| 2007/0043681 A1 | 2/2007 | Morgan et al. | |
| 2007/0050306 A1 | 3/2007 | McQueen | |
| 2007/0064672 A1 | 3/2007 | Raghav et al. | |
| 2007/0070906 A1 | 3/2007 | Thakur | |
| 2007/0070980 A1 | 3/2007 | Phelps | |
| 2007/0071223 A1 | 3/2007 | Lee et al. | |
| 2007/0074174 A1 | 3/2007 | Thornton | |
| 2007/0088836 A1 | 4/2007 | Tai et al. | |
| 2007/0091907 A1 | 4/2007 | Seshadri et al. | |
| 2007/0107048 A1 | 5/2007 | Halls et al. | |
| 2007/0112574 A1 | 5/2007 | Greene | |
| 2007/0116191 A1 | 5/2007 | Bermudez et al. | |
| 2007/0121651 A1 | 5/2007 | Casey et al. | |
| 2007/0127691 A1 | 6/2007 | Lert | |
| 2007/0127703 A1 | 6/2007 | Siminoff | |
| 2007/0130260 A1 | 6/2007 | Weintraub et al. | |
| 2007/0133771 A1 | 6/2007 | Stifelman et al. | |

(56) References Cited

U.S. PATENT DOCUMENTS

| | | |
|---|---|---|
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 2/2009 | Baitalmal et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Schwartz |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0037064 A1 | 4/2010 | Lawson et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari |
| 2010/0217982 A1 | 8/2010 | Brown et al. |
| 2010/0232594 A1 | 9/2010 | Lawson |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma |
| 2011/0143714 A1 | 6/2011 | Keast |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |

(56) References Cited

U.S. PATENT DOCUMENTS

| | | |
|---|---|---|
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0246287 A1* | 10/2011 | Wright ............... G06Q 10/00 705/14.45 |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0066175 A1* | 3/2012 | Pickering ............ H04M 3/5191 707/609 |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky |
| 2014/0025503 A1 | 1/2014 | Meyer et al. |
| 2014/0058806 A1 | 2/2014 | Guenette et al. |
| 2014/0064467 A1 | 3/2014 | Lawson |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0207877 A1* | 7/2014 | Kandaswamy ......... H04L 51/32 709/206 |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm |
| 2014/0355600 A1 | 12/2014 | Lawson |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, II |
| 2016/0001758 A1 | 1/2016 | Dornbush et al. |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |

(56) References Cited

U.S. PATENT DOCUMENTS

| | | | |
|---|---|---|---|
| 2016/0205519 A1 | 7/2016 | Patel et al. | |
| 2016/0226937 A1 | 8/2016 | Patel et al. | |
| 2016/0226979 A1 | 8/2016 | Lancaster et al. | |
| 2016/0234391 A1* | 8/2016 | Wolthuis | H04M 3/5233 |
| 2016/0239770 A1 | 8/2016 | Batabyal et al. | |
| 2016/0335074 A1* | 11/2016 | Olivier | H04L 67/1095 |
| 2017/0339283 A1 | 11/2017 | Chaudhary et al. | |
| 2018/0227332 A1* | 8/2018 | Neystadt | H04L 65/1053 |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 018489 | 2/2009 |
| WO | 2009124223 A | 10/2009 |
| WO | 2010037064 | 4/2010 |
| WO | 2010040010 A | 4/2010 |
| WO | 2010101935 A | 9/2010 |
| WO | 2011091085 A | 7/2011 |

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov.21-23, 2012. pp. 1-6.

Archive Microsoft Office 365 Email | Retain Unified Archiving, 2015, GWAVA, Inc., Montreal, Canada.

Complaint for Patent Infringement, *Telinit Technologies, LLC* v. *Twilio Inc.*, dated Oct. 12, 2012.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

\* cited by examiner

SYSTEM AND METHOD FOR A MULTI-CHANNEL NOTIFICATION SERVICE

CROSS-REFERENCE TO RELATED APPLICATIONS

This Application claims the benefit of U.S. provisional application No. 62/340,151, filed on 23 May 2016, which is incorporated in its entirety by this reference.

TECHNICAL FIELD

This invention relates generally to the communication field, and more specifically to a new and useful system and method for a multi-channel notification service in the communication field.

BACKGROUND

Today's digital services have grown beyond standalone web or mobile applications. Users expect an application or service to be accessible on any device (e.g., in the browser on the desktop or in an app on a smart phone). Increasingly, users expect to have the state on those devices to be synchronized, providing a seamless multi-channel experience. Additionally, with many services being social, actions can occur beyond a user's own actions, and a user may want to be notified of those changes. Various forms of notifications are used to alert a user of new information or events. However, building out useful notifications can be challenging and time consuming. Additionally, as a digital service diversifies its user base, the various user preferences and device variations present substantial challenges. Any digital service that wants to implement a world-class user experience for a multi-platform system, extensive investment is required in notifications. Thus, there is a need in the communication field to create a new and useful system and method for a multi-channel notification service. This invention provides such a new and useful system and method.

DESCRIPTION OF THE PREFERRED EMBODIMENTS

Figure 1:
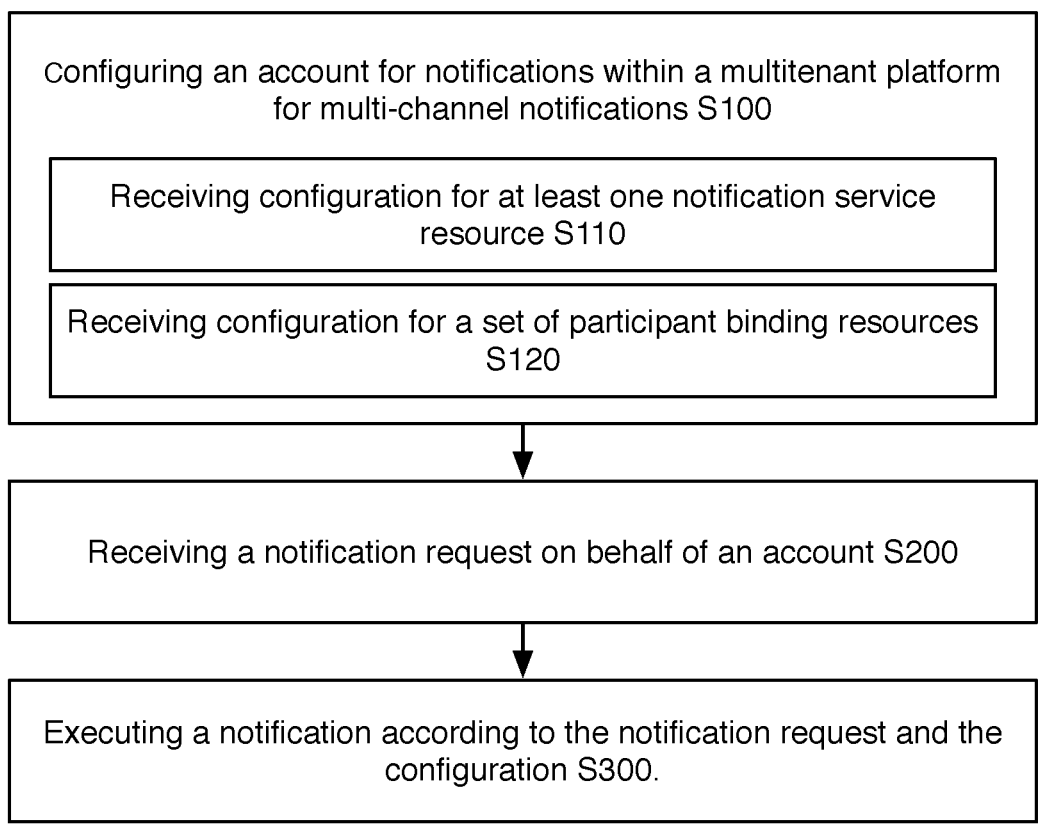
FIG. 1 is a schematic representation of a method of a preferred embodiment.

The following description of preferred embodiments of the invention is not intended to limit the invention to these preferred embodiments, but rather to enable any person skilled in the art to make and use this invention.

1. Overview

The system and method for a multi-channel notification service functions to provide a service enabling a streamlined approach to enabling notification features within a digital service or application. The system and method enable configuration of a notification service for an account such that audience selection, multi-channel notifications, orchestrated notifications rules and execution, and/or other features can be reduced to a programmatic notification request. Preferably, the system and method can enable notifications that can be sent out across different communication channels. Those communication channels could include SMS, MMS, an application push notification channel, a third party communication channel (e.g., a social network messaging service), email, browser or operating notification, a device endpoint, and/or any suitable channel.

Notifications can be any suitable communication used to alert a user. The notification is generally a one-way communication. Though some notifications may allow full or partial two-way communication. For example, a notification may be marked as delivered and/or seen as a form of partial two-way communication. Similarly, some notification communication channels may allow a response action or reply by a user. The system and method can be used as a mechanism for transactional notifications (i.e., notifications targeted at one or a select set of users relating to some individual event like a purchase or login event) and/or bulk notifications (i.e., notifications broadcast to groups of users).

The system and method are preferably implemented through a multitenant service platform. The multitenant service platform can enable multiple distinct accounts, sub-accounts or other entities to utilize the platform to enable notification features for their own distinct application or service offering. The multitenant service platform may operate as a platform as a service or software as a service type operation. The system and method preferably offer a set of mechanisms and processes through which users can more easily enable and control notifications. Additionally, with the engineering work centralized to a focused platform, multiple parties may benefit from improved and updated design of the platform. A developer could avoid developing custom infrastructure for communicating over multiple notification channels as well as avoiding maintaining and updating these channel integrations as they change.

As a first potential benefit, the system and method can offer a unified and normalized interface for using one or more notification channels. An outside service or product that wants to enable notification features can leverage one notification service instead of building out multiple communication channel integrations. For example, a developer could use a notification platform implementing the system and method in enabling notifications across a wide variety of formats, but while also using a simple intuitive programmatic interface for specifying notification content details.

As a second potential benefit, the system and method can enable configurable orchestration, where complex routing and fallback options can be simply configured ahead of time as default behavior for an account or on-demand for a particular notification request. Orchestration rules can be used to deliver to devices preferred by a particular participant, to fallback to secondary notification endpoints during failure, to fan out notifications across all notification channels, to automatically restrict notification delivery to particular time windows, and/or to apply other suitable orchestration rules. These orchestration options can be selectively invoked based on each particular notification and/or configuration of an account or notification service.

As a third potential benefit, the system and method may enable hierarchical notification definitions wherein a single notification request may enable notifications to be sent across multiple channels and be customized for a subset of those channels. Different notification channels will have different capabilities. For example, SMS may only allows for text while another channel may enable structured templates to define a custom interactive notification to be delivered within a notification channel. A notification can be simply delivered to multiple channels while custom features of particular notification channels may be leveraged.

As a fourth potential benefit, the system and method can enable customizing the notification experience for each participant. Participants will have varying preferences for how and when they are notified. In some cases, a participant may be accessible through multiple channels. For example, one user may want to receive SMS messages and not push notifications. And one user may want push notifications. The system and method could facilitate managing participant preferences.

The system and method can be utilized in a variety of use cases. Any application or digital service that needs to alert a user or device of some information may utilize the system and method. As one example, a digital marketplace may want to alert all buyers when a new relevant item becomes available or its price drops. As another example, on-demand dispatching applications may need to alert available "workers" (e.g., call-center agents, drivers, contractors, etc.) of a new "request" (e.g., a support ticket, passenger, job, etc.). Yet another example, news and content apps may want to notify users about new content.

2. Method for a Multi-Channel Notification Service

As shown in FIG. 1, a method for multi-channel notification service of a preferred embodiment can include configuring an account for notifications within a multitenant platform for multi-channel notifications S100, receiving a notification request on behalf of an account S200, and executing a notification according to the notification request and the configuration S300. The method is preferably implemented within a multitenant platform, but may alternatively be implemented by any suitable system.

The method functions to provide a service enabling a streamlined approach to enabling notification features within a digital service or application. The method can be used for facilitating notifications through any suitable set of communication channels. Preferably, the communication channels include SMS/MMS and at least a push communication channel (e.g., the Apple push network or the Google cloud messaging). Other potential communication channels can be asynchronous messaging channels such as proprietary messaging services with accessible APIs. A proprietary messaging service may enable notifications to a user within an application or a service. In another variation, the proprietary messaging service directs notifications to a device endpoint such as a wearable computer, an IoT device, a home or office digital assistant, and/or any suitable device. Other notification or communication channels may alternatively or additionally be used.

Block S100, which includes configuring an account for notifications within a multitenant platform for multi-channel notifications, functions to setup how notifications will be managed and executed within the system. A multitenant platform preferably supports configuring a set of different notification scopes. For example, an account that wants to use notifications can configure their account for notifications. An account may additionally setup multiple instances of notification configuration. Herein we describe the configuration and management of the notification being associated with an account. However, notification configuration may alternatively be associated with any suitable entity or scope such as a subaccount.

Configuring the account for notifications can involve configuring the different communication channels and the various participants to be accessed during a notification. This preemptive configuration can make subsequent notification requests simpler to implement. The configuration can preferably be characterized and architected through a set of different resources. The resources can be API resources, data object classes, data model architecture, or any suitable data object. While there may be a variety of ways of receiving and setting configuration, the multitenant platform preferably enables at least one programmatic interface and more preferably a REST API.

In particular, configuring the account for notifications can include receiving configuration for at least one notification service resource S100 and receiving configuration for a set of participant binding resources S120.

Block S110, which includes receiving configuration for at least one notification service, functions to define the various communication channels used for notification. A notification service can be referenced when making a notification request, which will cause the configuration of the notification service resource to be utilized in executing the corresponding notification.

Figure 2:
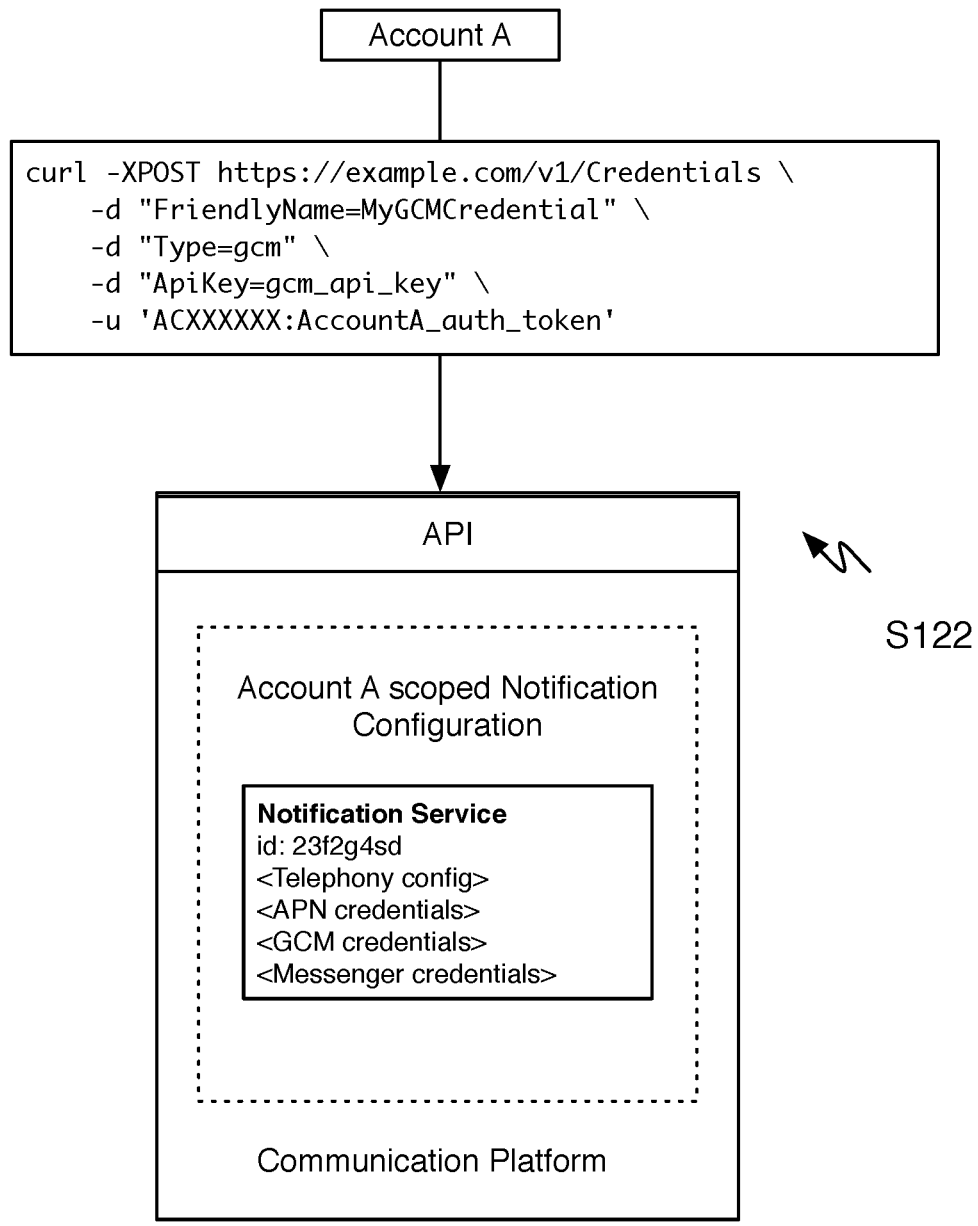
FIG. 2 is a schematic representation of instantiating channel credentials.

Configuring a communication channel can include instantiating channel credentials of a communication channel for a notification service S112 as shown in FIG. 2. A notification service resource can include various properties such as identifying information (e.g., a unique ID and/or a friendly name) and credentials for a set of communication channels. The identifying information can be used for referencing or identifying the notification service. The credentials for a communication channel can include the authentication information and/or any suitable configuration information needed for using a particular communication channel. For a proprietary communication channel this may include setting API credentials and/or certificates. For example, a secure identifier code may be specified and used in the platform interfacing with the proprietary communication channel on behalf of the account holder. Other options such as a protocol version identifier, and/or other options may additionally be supplied. For example, Apple Push Network and the Google Cloud Messaging may include a secure identifier credential and a protocol version property. A third party social network (such as Facebook) may include a secure identifier credential, a social network page identifier, and/or any suitable property. The communication channel credentials are preferably those associated with the account owner. For example, a business will use a multitenant platform account to create the notification service and will setup their credentials from an outside notification service such that the multitenant platform can act on behalf of the account owner with the outside notification service.

With regard to telephony communication channels such as SMS, MMS, and/or PSTN calls, a telephony endpoint (e.g., a phone number, short code, toll free number) can be registered and identified for use with the notification service. Configuring a communication channel can additionally or alternatively include registering and identifying a communication endpoint for use with the notification service. An account may have one or more communication endpoints configured for particular communication channels. For example, an account could have one phone number or a pool of phone numbers, which could be used for SMS messages, MMS messages, or phone calls. As another example, an account could have a SIP address or other credentials setup. A communication endpoint can be a phone number, a short code, toll number, a SIP address, and/or any suitable communication endpoint identifier used for routing communication within a communication network. In one implementation, an account holder can purchase and set up multiple telephony endpoints to be managed and/or used by the account holder within the communication platform. When setting up a notification service, one or multiple telephony endpoints operated by the account holder could be selected for use with the notification service. In an alternative implementation, the communication platform can have a pool of telephony endpoints that may be shared by account holders, in which case there may be no explicit identification of which telephony endpoint is used as that would be automatically selected by the communication platform.

The notification service is scoped to the account, and an account could create and manage a set of different notification services. The set of notification service resources could be queried at any suitable time through the API or an alternative interface. This may be particularly applicable in a multitenant communication platform that enables nested account scopes where one account scope can create a subaccount, wherein each account could build an application that enables a multitenant application or service. Multiple notification services can be operated within an account but individually managed within subaccounts of the parent account. Multiple notification services within an account can additionally be used so that one account can be used to manage different applications, services, or products of the account holder. For example, an account holder with multiple products may instantiate multiple notification services with different configuration, where each notification service is used in servicing each individual product.

Block S120, which includes receiving configuration for a set of participant binding resources, functions to set the addressing information for participants for one or more communication channels. The participant binding resources preferably establishes data/modeling records that can be used in executing a notification request. Preferably, destination endpoints or addressing information is established through the participant binding resources. Generally, speaking the participant binding resources can be updated and maintained by an account holder. For example, existing addressing information can be used in creating a number of participant binding resources, and then add or modify the addressing information as the account holder receives updates. Preferably, the endpoint addressing information such as phone numbers, email addresses, or other communication addresses are explicitly specified in the participant binding resources. Alternatively, the endpoint addresses may be stored and maintained outside the communication platform and are referenced at the time of sending a notification, which may be useful if an account does not want to entrust a third party like the communication platform with addressing information. Both approaches could be used in combination.

Various architectures of participant binding resources may be used where information and information associations can be structured in different ways. The participant binding resources can in some architectures include properties that relate to an account reference, a service reference, communication channel identifying properties, a communication address identifier, a participant identifier, and/or other addressing properties. The various participant binding resources can be directly associated with one notification service resource. Deleting a notification service resource can result in deleting associated binding resources.

Figure 3:
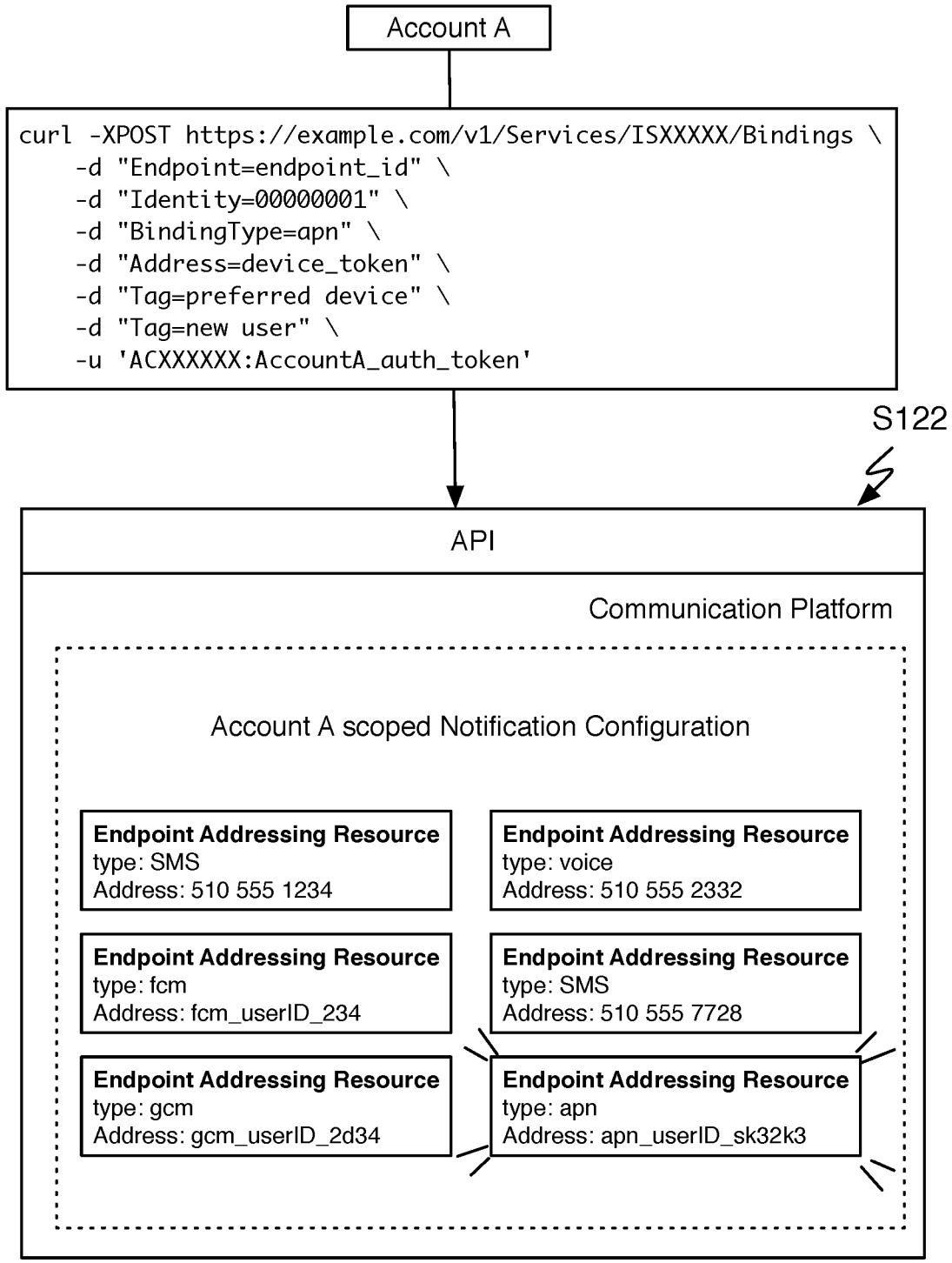
FIG. 3 is a schematic representation of configuring endpoint addressing resources.

In a first variation, receiving configuration for a set of participant binding resources comprises receiving configuration of endpoint addressing resources S122 as shown in FIG. 3. The endpoint addressing resources (i.e., endpoint bindings) function to establish communication addressing information that can be used as destinations of notifications. An endpoint addressing resources is preferably associated with at least one notification service resource of an account, either explicitly or implicitly. An endpoint addressing resource preferably includes a communication address and a communication channel identifier. The communication address can be specific to the channel, and similarly the format can vary for different channels. The address property can be a token, a phone number, a username, email address, and/or any suitable address. Additionally, an endpoint instance identifier can be used to distinguish a particular application installation from other application installations. For example, a user of a messaging application may have multiple devices where the same username is used as the communication address. An endpoint instance identifier can be used to distinguish between those different application installations. In one variation, the endpoint instance identifiers can be generated on the device and used in setting the endpoint instance identifier.

The communication channel identifier can identify the type of communication channel to be used and may additionally include a protocol version number and/or any suitable information. For example, communication channel identifier options can include "SMS", "PSTN", "Company X messenger service", "Company Y push notification service", and the like. The endpoint addressing resource can additionally include communication channel credentials. The communication channel credentials may be used to override default channel credentials.

Additionally, the participant binding resources and more specifically the endpoint addressing resources can be assigned tag properties to facilitate convenient references to the resource. The tags can be string based labels or other identifiers, which may be used for bulk operations with the bindings. The tags can be account/developer defined. The tags can be specified during creation of the endpoint addressing resource, but could additionally be updated after the creation of the endpoint addressing resource. Additionally, a set of tags may be automatically assigned to a binding based on properties of the participant binding resource. For example, automatic tags can include "all" to reference all bindings), "apn" to reference Apple push network bindings, "gcm" to reference Google cloud messaging bindings, "sms" to reference a telephony binding, "facebook-messenger" to reference Facebook messenger channel bindings, and/or any suitable automatic tags. Similarly, analysis of the endpoint address can be used to generate tags. For example, a phone number could be analyzed and geographic associations of that phone number could be used as tags. For example, the associated country from the country code, region from an area code, phone type (land line vs. mobile), and/or other extracted information can be used as tags.

Endpoint addressing resources can additionally include a participant identifier. The participant identifier can be an account defined identifier for a participant such as a unique user identifier string or an email address. The participant identifier functions as a convenience property for optionally specifying notification destinations by participant identifiers instead of endpoint addresses. However, a preferred variation is to include distinct participant resources that can be associated with the endpoint addressing resources to better reflect how a participant may have multiple usable endpoint addresses.

Figure 4:
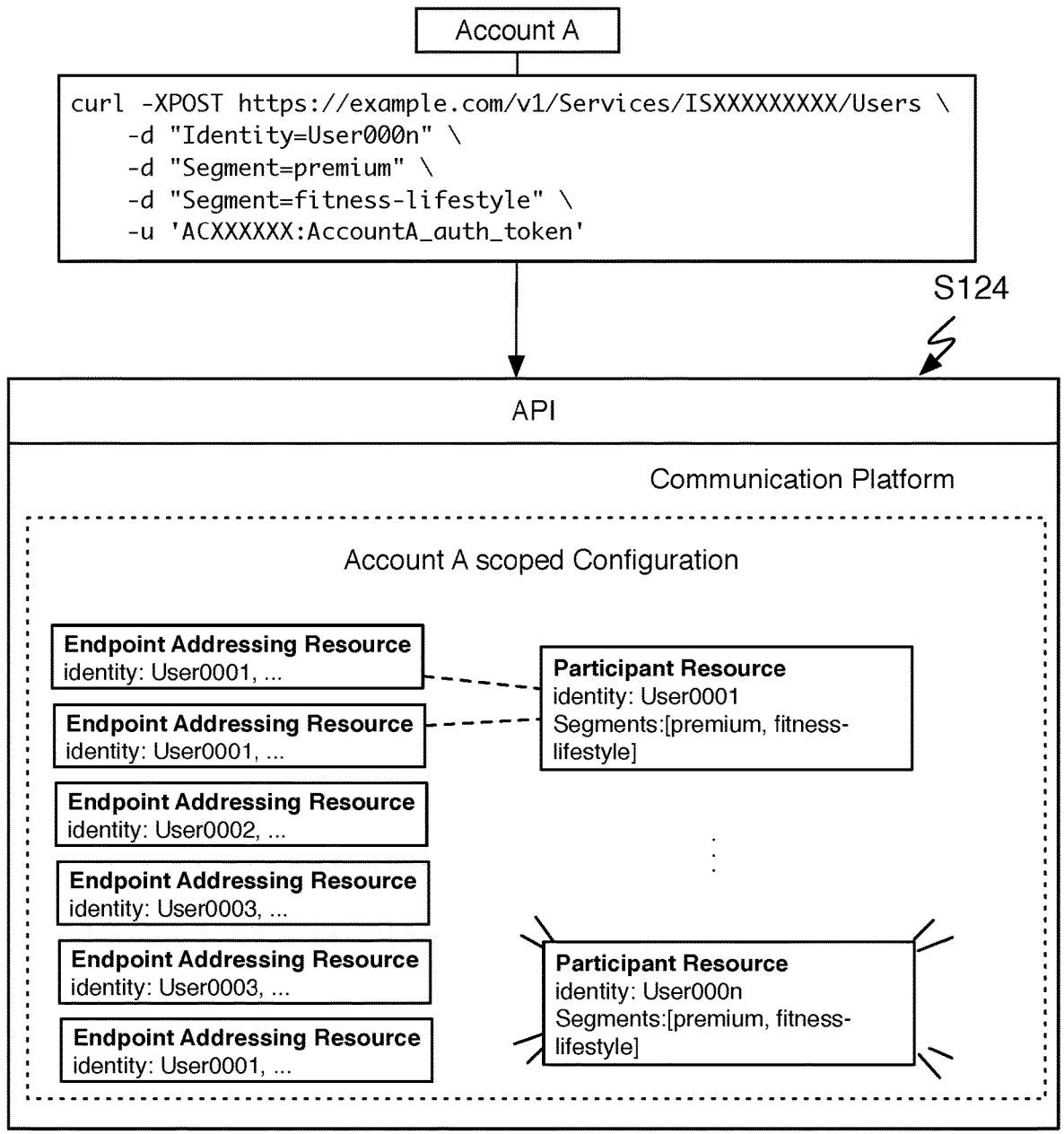
FIG. 4 is a schematic representation of configuring participant resources.

In another variation, receiving configuration for a set of participant binding resources comprises receiving configuration of endpoint addressing resources S122 and receiving configuration for participant resources S124 as shown in FIG. 4. A participant resource can be associated with a subset of the endpoint addressing resources, and a number of participant resources can have individual associations with distinct sets of endpoint addressing resources. The participant resource functions as a higher level abstraction of the communication destination that focuses on the end user. The participant resource can enable a developer to group endpoint addressing resources that belong to the same participant. In this way, notification destinations can be specified by participant instead of a communication address. Associating endpoint addressing resources with a participant can be used to enable preferred device selection for a participant, for fanning out a notification to all possible communication endpoints of a participant, to do communication address fall over where a backup destination can be used if an initial one fails, and/or other suitable notification orchestrations.

Additionally, an additional grouping construct can be offered so that participants can be associated with participant groups or segments. In one variation, a participant group can be another type of participant binding resource that can have associations with many participant resources and, by extension, multiple communication addresses. In another variation, participant resources can include a tag property. A participant grouping may be used to specify participant classifications. For example, an account holder may create participant group resources for different user tiers (e.g., premium, free, etc.) so that those different groups of users can be notified as a group. The participant groups can be any suitable subsets of the participants. For example, two participant groups can include participant resources that are associated with both participant groups.

Figure 5:
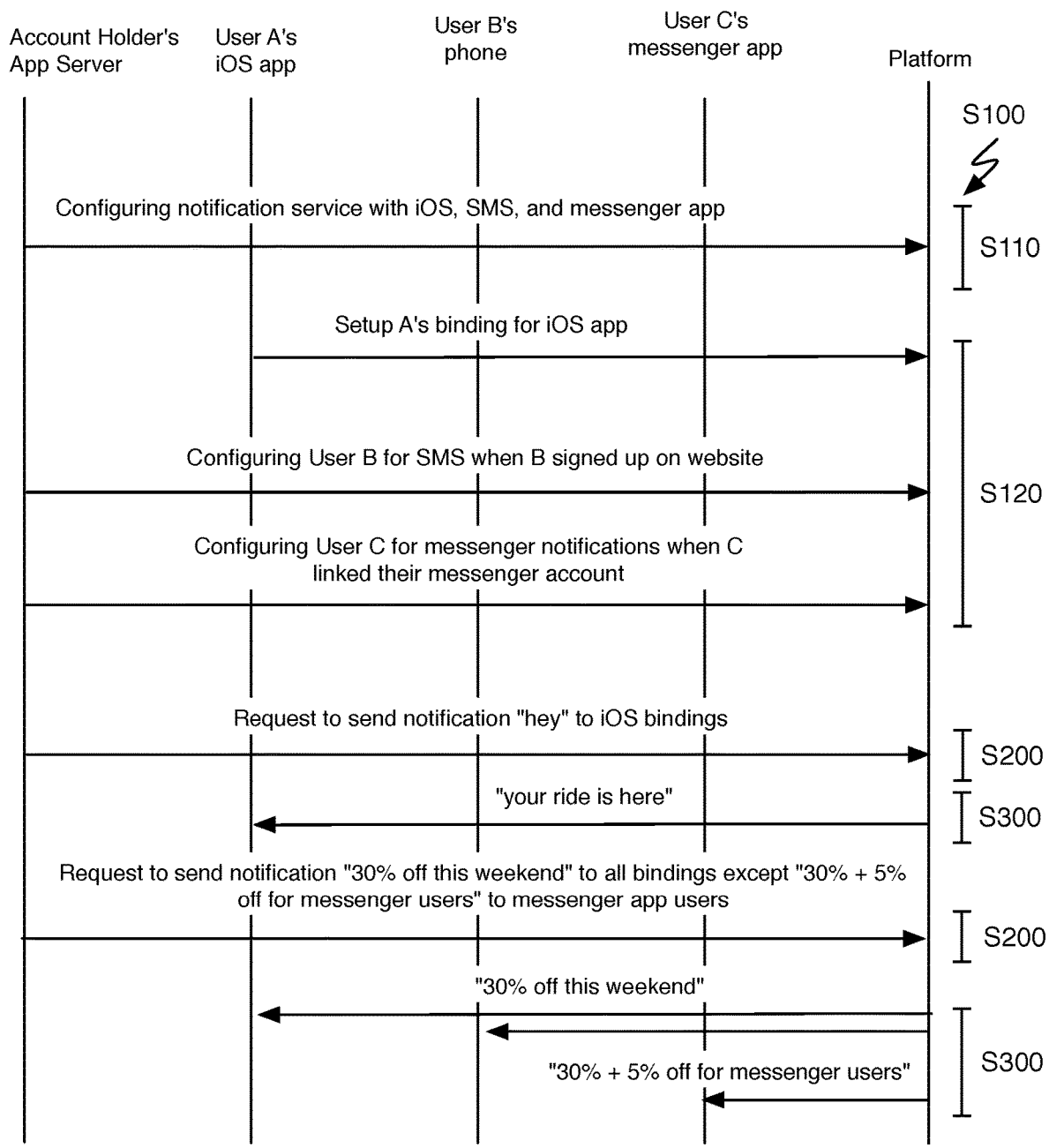
FIG. 5 is an exemplary communication flow diagram of a method of a preferred embodiment.

Generally, a notification service resource will be initially configured, and participant binding resources will subsequently be created as end users of the account are enrolled as shown in FIG. 5. For example, a digital service will want to use the multitenant platform to facilitate notifications for the digital service. The digital service will create a notification service within the platform. Within the digital service, users will join the digital service or register for receiving notifications from the digital service. One user may install an iOS application of the digital service and select to enable push notifications—participant binding resources for that application instance within the apple push network will be created. The participant binding resources would include endpoint addressing resource that characterizes the addressing information to that iOS application instance, and the participant binding resources could optionally include a participant resource for that user which would have an association with the endpoint addressing resource. Another user may select a preference to receive notifications over SMS—participant binding resource will be created for that user to that SMS address (e.g., a phone number).

Block S200, which includes receiving a notification request on behalf of an account, functions to initiate sending of one or more notifications. The notification request can be used to deliver a specific notification to a targeted participant or group of participants. For example, a taxi application may want to notify a customer that their taxi has arrived, and notification can be sent to just that participant by specifying the notification content and the identify of participant. The configuration of Block S100 can be used to deliver the notification appropriately. The notification request can similarly send notifications to multiple targeted participants. In other scenarios, a digital service may want to fan out a general notification to a wide audience. In this notification, tags can be utilized to specify particular endpoints without explicitly providing a list of each endpoint at the time of the notification.

In different instances, different notification requests can be received and executed through blocks S200 and S300 where each is individually processed. In one instance, a notification request can broadcast notifications to a group of participants. In another instance a different notification request can send a transactional notification to one or a limited set of participants. In another instance, a notification request can be processed so that notifications use a fallback option. The various features implemented in the method can be selectively invoked in different notification requests.

A notification request can be received through an API request. For example, an HTTP-based POST request can be received with a set of request properties defining how a notification should be sent. A notification request may alternatively be specified within a script or application that is processed within the platform. In yet another variation, a user interface or dashboard may be presented to enable an administrator of the account to manually specify and send out notifications through a dashboard or an alternative user interface.

A notification request preferably specifies a notification service, targeting property, and payload definition. The notification request can additionally include delivery options or authenticating or scope identifying information such as an account secure identifier. The notification service identifier is used to map the notification to configuration. In some variations the notification service identifier is not needed as the notification service and its configuration is directly associated with the account.

The targeting property can be specified in a variety of approaches. In a first approach, the targeting property includes a set of endpoints, set of participant identifiers, participant group identifier, and/or tags. An endpoint can be used to send to a particular device instance of a participant as specified by an endpoint addressing resource. A participant identifier may be used to send a notification to one or more endpoints associated with the participant as specified by a participant resource. A participant group identifier may be used to send a notification to one or more endpoints of participants associated with the group. Tags can be used to send to endpoints associated with the tags. In one variation, the targeting property can be conditional so that all their properties must be matched. Different logical rules may be used in processing how multiple targeting properties are handled. In one implementation, the notifications can be sent to the union of endpoints defined by all the targeting properties. For example, targeting properties may specify identifiers for a set of endpoint addressing resources and also a number of tags, and all endpoints that match the set of endpoints or any of the tags may be notified. In another implementation, notifications can be sent to the overlap of endpoints defined by all the targeting properties. In a similar example to above, targeting properties may specify identifiers for a set of endpoint addressing resources and also a number of tags, and then only a subset of the identified endpoints that also share the identified tags are notified. In yet another implementation, notifications can be sent to endpoints based on some prioritized analysis of the targeting properties. However, any suitable logical processing of multiple targeting properties may be used.

In one variation, the targeting property may additionally or alternatively reference an external resource, wherein targeting property can be accessed from a remote server at the time of the processing of the notification request. The external resource can be a specified URI that preferably hosts a resource that can provide endpoint addressing information in place of or to supplement the endpoint addressing resources. For example, one targeting property can be an endpoint callback URI. When processing a notification request with an endpoint callback URI an application layer request (e.g., an HTTP/S request) is transmitted the callback URI. The server responsive to that request can provide a static document or generate a document that will specify addressing endpoints and relevant information like communication channel identifier and credentials as in an endpoint addressing resource. Authentication and/or whitelisting of the IP address used by the communication platform can be used when communicating with the external resource to secure the list of targeting property. This variation can enable an account holder to avoid storing targeting property permanently with the communication platform.

The notification request can additionally include delivery option properties such as a priority property, a time-to-delivery property, a maximum delivery cost, a preferred device option, a fallback option, a fan out option and/or other transmission options. The delivery option properties can be used to specify different notification orchestrations or approaches to managing notifications. In some cases, the delivery option properties will only impact the notification delivery and handling for a subset of communication channels.

The priority property may be recognized by different communication channels to prioritize the delivery of the notification. For example, some push notification channels may have high and low priority options which change how notifications are delivered in consideration of battery consumption of the device. The priority property can additionally be used within the communication platform for how it handles delivery of notifications across the account and/or platform. In one example, low priority may be accompanied with an unspecified delivery time while a high priority may have an expected delivery time window (e.g., immediate, in next 5 minutes, etc.).

The time-to-live property specifies how long the notification request is valid within the platform. The time-to-live property is preferably a specified length of time. A countdown clock will be initialized synchronized to the receipt of the notification request when a time-to-live property is present. After the time specified in the time-to-live property expires, any unsent notifications are canceled. This may be applicable for notifications that are only relevant for a certain amount of time.

A maximum delivery cost will limit the per notification or total amount to be spent fulfilling the notification request. As there may be a cost associated with transmitting the notifications through the multitenant platform, a maximum delivery cost can prevent a notification request from going above expectations. This can be particularly useful when sending notifications across multiple communication channels. The method abstracts away the end communication channel but there will be some financial impact to sending notifications based on the distribution of endpoint addressing resources associated with metered and/or billed communication channels like SMS or MMS. In some variations, the maximum delivery cost can be specified individually for specific communication channels. Processing of a maximum delivery cost property can be used in combination with a fallback option or other orchestration options. In one variation, once the maximum delivery cost limit is met then notifications can proceed for participants that have available free communication channels. For example, a notification may be initially intended to be sent over SMS for one participant but after the price for that notification is surpassed, the notification will be sent over a social media communication channel to that participant.

A preferred device option will facilitate selection of an endpoint addressing resource to be used for a targeted participant when multiple options are available. The preferred device option may be a Boolean value to activate preferred device delivery of notifications. The preferred communication channel and/or device instance (in the case where there may be multiple application instances of the same communication channel) can be indicated through tagging of an endpoint addressing resource. For example, in the creation of an endpoint addressing resource a preference tag (e.g., the tag string "preferred device") can be added. Then when preferred device option is activated in a notification request that endpoint addressing resource will be selected for sending that notification over other participant associated endpoint addressing resources.

In another variation, the preference or priority of different communication channels can be specified within the notification request or the notification service. These can act as defaults for that notification or account. For example, one account may set their default priority to SMS then voice then a social media messaging channel, but another account may set their default priority to a social media messaging channel, then email, and then SMS.

A fallback option can be a delivery that enables a backup endpoint addressing resource to be used as a delivery target when delivery is unsuccessful for an attempted notification to an initially used endpoint addressing resource. The fallback option can be a Boolean option that can be enabled for notifications over supported communication channels. Supported communication channels preferably have a delivery confirmation mechanism. The delivery confirmation can provide delivery confirmation (e.g., send successfully) and/or read confirmation (e.g., viewed by user). Unsuccessful confirmation can trigger a subsequent notification using a different approach. Success and failure can be defined in different ways. In one implementation this can be a time window where some confirmation must be satisfied. In another implementation it may be the receipt of some error status like delivery failure. The failure condition may be defined or specified in the notification request or within the notification service configuration. In one example, a notification may first be attempted over a push notification network for a participant and then an SMS can be used for notification if delivery is unsuccessful after ten minutes.

A fan out option can be a delivery option that enables notifications to be sent out to all endpoint addresses of a participant. A fan out option may be invoked in a notification request if the account holder wants to increase likelihood that end participants receive the notifications. This may be used in cases, where an important alert is being sent out and the account holder prioritizes participants getting the notification over receiving redundant notifications across different communication channels and/or devices.

The payload properties of the notification request preferably defines the content of the notification to be communicated to the end user of the target endpoint. The payload properties preferably include a body such as a text string.

The payload properties can additionally include a title property, a media property, a sound property, an action property (e.g., actions to be displayed for the notification), data property, and/or other suitable properties. The notification request can additionally include a hierarchical definition of the notification and in particular the payload properties. Hierarchical definitions allow general default payload properties to be specified, but for customized notifications to be defined for particular communication channels so as to override corresponding payload defaults. Channel-specific payload properties can be defined for one or more communication channels. The channel specific payload properties may support channel specific features and/or capabilities. Support for channel specific payload properties can enable custom features of a communication channel to be used through the communication platform even when sending notifications across multiple communication channels.

Block S300, which includes executing a notification according to the notification request and the configuration, functions to attempt to transmit notifications. Initially the notification request can be processed and validated. For example, the notification can be validated as being authentically associated with an account. Additionally any required properties can be validated. Executing notifications can include selecting endpoint addressing resources that are accessed from the participant binding resources using the targeting properties of the notification request and transmitting notifications to communication addresses over a set of different communication channels as indicated by the selected endpoint addressing resource. The transmission or attempted sending of notifications is preferably executed by, for each selected endpoint addressing resource, transmitting a notification to the specified communication address of the endpoint addressing resource through a communication channel that is specified by the communication channel identifier of the endpoint addressing resource.

The different communication channels can include different formats and communication mediums. In one variation, transmitting notifications over a set of different communication channels can include transmitting an asynchronous message to a communication address specified by a selected endpoint addressing resource. In another variation, transmitting notifications over a set of different communication channels can include transmitting initializing a synchronous communication stream and playing a message for at least one communication address.

If the notification request is valid, then the referenced participant binding resources and configuration are selected, accessed, and used in executing the notification to one or more destinations. The participant binding resources that are accessed are those referenced in the targeting properties of a notification request. The endpoint identifiers, participant identifiers, participant group identifiers, tags, and/or other properties may be used to specify the destination endpoints. These are used to identify and select endpoint addressing resources. As described above, various approaches may be used in accessing the referenced endpoint addressing resources. In some cases, the delivery options specified for a notification or account can additionally be used in selecting the appropriate endpoint addressing resources. For each of the accessed endpoint addressing resource a notification can be attempted. Preferably, a selected endpoint addressing resource will indicate the communication channel and addressing information within the communication channel, and the notification service can include the channel credentials and general information to deliver a notification.

In the instance variation where a notification request includes a preferred device option, executing the notifications can include selecting an endpoint addressing resource that is associated with a participant resource and indicated as a preferred device. Indication of a preferred device can be through a special tag that can be applied to an endpoint addressing resource. Alternatively preferred device may be an internally applied tag through analysis and usage history of endpoints of a participant.

In the instance variation where a notification request includes a fanout delivery option, the selection of appropriate endpoint addressing resources will involve selecting all endpoint addressing resources associated by the targeted/specified participant resources.

Executing a notification can additionally include generating the notification content, which functions to determine the payload of a transmitted notification. As mentioned above, the payload properties can be defined hierarchically. The payload properties for notification sent over a specific communication channel can include using the default payload properties unless additional or overriding payload properties are specified for that communication channel. A customized notification payload can be generated for each communication channel that will be used for a given notification. Finally, a notification request is submitted or transmitted over the appropriate communication channel. Each communication channel may have varying protocols and/or technology to issue a communication. Additionally, transmission of notifications can be independently managed for different communication channels, which can enable rate limiting, volume limits, and independent metering of notifications over different channels. The multitenant platform can hide these complexities from the account holder (e.g., the developer).

In the instance where the notification request includes a tag identifier, selecting an endpoint addressing resources that are accessed from the participant binding resources using the targeting properties of the notification request can include selecting endpoint addressing resources queried with the tag targeting property of the endpoint addressing resources. The tag identifier is used to access the endpoint addressing resources with that tag property. In some cases, that tag property may have been automatically generated. Multiple tag identifiers could be indicated in the notification request. Using AND Boolean logic/intersection logic, the selected endpoint addressing resources may have tag properties that include each tag identifier. Using OR Boolean logic/union logic, the selected endpoint addressing resources may have at least one tag property matching one of the tag identifiers.

In another instance, the notification request can include a tag identifier and a participant group identifier. In this variation, the participant binding resources includes participant resources associated with a participant group (e.g., as a group resource or having a group label/tag). In this instance, selecting endpoint addressing resources can include selecting endpoint addressing resources according to the participant group identifiers and tag identifiers. Similar with the tags above, the group identifiers and tag identifiers can be used with union or intersection type selection logic.

In the instance variation where a notification request includes a priority option, then notifications can be executed as a prioritized notification when supported by a communication channel. In this instance, at least one endpoint addressing resource includes a tag property identifying the endpoint addressing resource as preferred. Preferably only one endpoint addressing resource can be tagged or indicated as preferred. Alternatively, multiple endpoint addressing resources can be tagged or indicated as preferred in which case multiple preferred devices can be notified. The notification request will include some targeting property such as a participant group identifier, a tag identifier, and/or a participant identifier. During priority option, selecting endpoint addressing resources that are accessed from the participant binding resources using the targeting properties of the notification request will include selecting an endpoint addressing resource that is associated with the participant resource and identified as preferred. In this way a participant's preferred communication address and/or application instance can be notified.

In the instance variation where a notification request includes a delivery cost property, transmitting a notification can include tracking metered cost of transmitted notifications associated with the notification request and alerting notification transmissions when the metered cost satisfies the delivery cost property. Altering notification transmissions can include canceling notification transmissions or altering communication channel. Altering of communication channel preferably includes selecting a fallback or alternative endpoint addressing resource of a participant resource when a communication channel of an initial endpoint addressing resource has surpassed a maximum delivery cost for the notification.

In some variations, executing a notification can include receiving a notification response and parsing the notification response. Some communication channels can support replies or actions that respond to a notification. The communication platform can facilitate receiving and processing those responses. In one variation, the method can include updating notification state in association with a notification record. In another variation, the response can be relayed to an external application service specified by a response callback URI.

In one implementation, a delivery response can be facilitated by providing a notification SDK that can be integrated into an application. At an instance of an application with a notification SDK integration, detecting notification and delivering notification receipt state to the communication platform. This can include updating delivery status, read status, response status, and/or any suitable information. This implementation may be useful when delivery status information is not available. Some communication channels may provide built-in support for delivery status updates.

In the instance variation where a notification request includes a fallback option, executing a notification can include, collecting delivery status of an initially executed notification, and in response to the delivery status, selecting a secondary endpoint addressing resource of a participant and transmitting at least a second notification using the secondary endpoint addressing resource. This can include generating a new notification payload that is appropriate to the updated communication channel. The delivery status can be detection of a delivery or read receipt within a time window, receipt of a delivery error, or any suitable condition.

3. System for a Multi-Channel Notification Service

Figure 6:
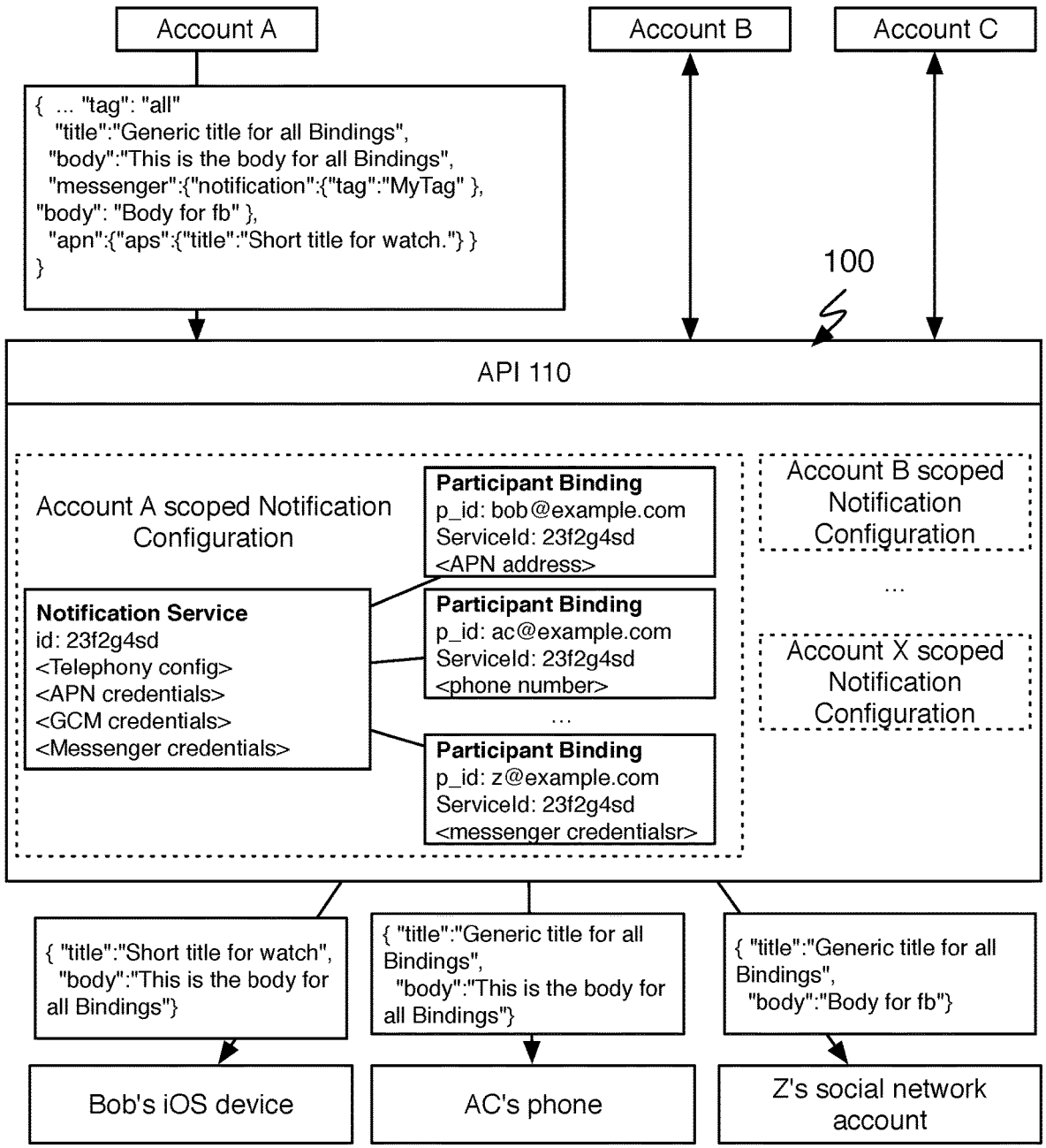
FIG. 6 is a flow diagram representation of a system of a preferred embodiment.

As shown in FIG. 6, a system for multi-channel notification service of a preferred embodiment can include a multitenant communication platform 100 and an interface 110 to a set of notification programmatic primitives. The system is preferably operated so as to perform the method above, but may additionally or alternatively facilitate other operations. The system functions to provide a service with a streamlined approach for enabling notification features within a digital service or application. The system can be used for facilitating notifications through any suitable set of communication channels. Preferably, the communication channels include SMS/MMS and at least a push communication channel (e.g., the Apple push network or the Google cloud messaging). Other notification or communication channels may alternatively or additionally be used.

The multitenant communication platform 100 preferably allows multiple accounts to use the communication platform in facilitating various communication tasks that include at least notifications. Additionally, each account within the multitenant communication platform 100 may itself have a subaccount. Accordingly, an account may support multiple communications for different sub-account holders wherein communication, data/analytics, billing, and/or other aspects can be scoped to an account, a sub-account, or any suitable scope. The communication platform can additionally be a cloud-hosted platform. The communication platform can be a server, a server cluster, a collection of components on a distributed computing system, or any suitable network accessible computing infrastructure.

The interface 110 to a set of notification programmatic primitives functions to enable account holders or other entities to configure and execute notifications. The interface preferably includes a programmatic interface, but may alternatively include a user interface. The user interface can be an application or dashboard used in manual execution and configuration of notifications. The programmatic interface functions to enable integration and use of the notification service to be added to a third party service or application. The complexities of managing notifications are delegated to the system. The developers of the third party applications or services can focus on the core aspects of their product rather than implementing features of a notification solution.

A programmable interface can provide one or a number of programmatic interfaces such as an API, an event callback system, or application logic processing system.

An API service is preferably a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as API endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. Information about a conversation is preferably stored and made accessible through conversation API resources. Additionally participant API resources can be created and made accessible. In addition to obtaining information, actions can be initiated through the API. For example, conversations may be initiated or ended, participants can be added or removed, media features enabled or disabled, and/or any suitable action can be triggered. An API is preferably used to remotely interact with notification primitives when setting up or sending a notification.

An event callback system can function to enable event triggers or webhooks to be activated in response to different state changes or events. Event callbacks can be account-customized conditions that result in an event response when the condition is satisfied. An event callback configuration can leverage internal information of the platform but without exposing the used internal information to an outside account entity. When an event callback condition is satisfied, a configured event is executed. The event could be an internal operation, a callback event, or any suitable action. An internal operation can be a closed action that may not be fully exposed to an account holder. A URI callback event preferably includes making an application layer protocol communication to an external resource located at the specified URI. A callback event may alternatively be configured by account for any suitable event such as when a conversation starts, when a conversation ends, when a property of a conversation satisfies some condition or threshold, or any suitable condition.

Application logic processing may enable business logic to be defined through an executable document. Preferably, application logic is specified through a structured document. In one variation, a markup language document can be used in specifying a set of instructions and conditions that can be sequentially executed. The application logic may be retrieved from a remote server. For example, the event callback system may retrieve application logic from a URI, which is then processed in association with a conversation. Application logic may alternatively be stored within the communication platform.

In one variation, an event callback may return application logic for processing. In one implementation, a notification request may be specified within the application logic.

The set of notification primitives preferably include a notification service resource, a participant binding resource, and a notification resource. As described above the notification service resource functions to setup the general configuration related to the enabled communication channels. The participant bindings are established to define how individual endpoints of a communication channel can be reached. In some cases an endpoint is a phone number. In the case of proprietary push notification networks or over-the-top messaging platforms, device identifiers or other suitable addressing tokens may be used. The notification resource can be used in requesting and reviewing notifications send from an account.

Generally, a developer that wants to use the system will create an account on the multitenant communication platform 100. Then the developer can setup a notification service resource for different communication channels the developer plans on using. For SMS and MMS this may involve importing a phone number or buying a phone number to use with the platform. For push notifications or third party communication channels, the developer may need to collect credentials from the various communication channels (where the developer may have distinct accounts for those services/platforms) and add those credentials to the notification service resource. Then the developer can onboard users. In one implementation, the developer may use an SDK, library, or API of the system when building an application or service. The developer can configure their own application logic to update the platform and onboard users as participant binding resources. The developer may customize the way a participant binding is established by detecting or asking a user for preferences in how notifications are received. The user preferences can be reflected in how bindings are setup. Then when a notification needs to be sent, a request can be made to the notification resource to send a notification. The configured information is used in intelligently sending notifications to the targeted endpoints.

The system and method of the preferred embodiment and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving, by a multitenant communication platform, configuration data for a set of participant binding resources of a first account of the multitenant communication platform;
receiving a notification request on behalf of the first account of the multitenant communication platform, the notification request comprising a targeting property, wherein the targeting property includes an identifier for an external resource;
transmitting a request to the external resource based on the identifier included in the targeting resource;
receiving, from the external resource, data identifying a set of endpoint addressing resources, each endpoint addressing resource from the set of endpoint addressing resources specifying a communication address and a communication channel identifier;
executing notifications in accordance to the notification request, the configuration data of the participant binding resources of the first account of the multitenant communication platform, and the set of endpoint addressing resources received from the external resource, wherein executing the notifications comprises transmitting notifications to communication addresses over a set of different communication channels as specified by the set of endpoint addressing resources.

2. The method of claim 1, further comprising:
tagging at least one endpoint addressing resource with a first tag from a set of tags, wherein the data identifying the set of endpoint addressing resources includes the first tag, the method further comprising:
identifying one or more endpoint addressing resources tagged with the first tag, yielding the set of endpoint addressing resources.

3. The method of claim 1, further comprising:
in response to receiving the notification request, activating a fallback delivery mode option;
collecting a delivery status of an executed notification that referenced a first endpoint addressing resource from the set of endpoint addressing resources, the first endpoint addressing resources having been identified as a preferred endpoint addressing resource; and in response to collecting the delivery status, selecting a secondary endpoint addressing resource from the set of endpoint addressing resources and transmitting at least a second notification using the secondary endpoint addressing resource.

4. The method of claim 1, wherein the notification request indicates a fanout delivery mode option.

5. The method of claim 1, wherein transmitting notifications to communication addresses over the set of different communication channels comprises:

transmitting an asynchronous message to a communication endpoint specified by a first endpoint addressing resource from the set of endpoint addressing resources.

6. The method of claim 1, wherein transmitting notifications to communication addresses over the set of different communication channels comprises:

initializing a synchronous communication stream; and
playing a message specified in a payload property of the notification request.

7. The method of claim 1, wherein the set of different communication channels comprises an SMS channel, a push notification channel, a PSTN voice channel, and a proprietary service API channel.

8. The method of claim 1, wherein at least one of the set of different communication channels is a proprietary service API channel to a device endpoint.

9. The method of claim 1, wherein the notification request specifies payload properties specific to a first communication channel and transmitting notifications to communication addresses over the set of different communication channels comprises generating notification content using the payload properties specific to the first communication channel.

10. The method of claim 1, wherein transmitting notifications to communication addresses over the set of different communication channels comprises:

transmitting, over a first communication channel, a first notification to first endpoint addressing resource; and
transmitting over a second communication channel, a second notification to second endpoint addressing resource.

11. The method of claim 1, further comprising:

after receiving the notification request, receiving a second notification request comprising a second targeting property identifying a first endpoint addressing resource; and
in response to receiving the second notification request, transmitting a notification to a communication address specified in the first endpoint addressing resource.

12. A multitenant communication platform comprising:
one or more computer processors; and
one or more non-transitory computer-readable mediums storing instructions that, when executed by the one or more computer processors, cause the multitenant communication platform to perform operations comprising:
receiving configuration data for a set of participant binding resources of a first account of the multitenant communication platform;
receiving a notification request on behalf of the first account of the multitenant communication platform, the notification request comprising a targeting property, wherein the targeting property includes an identifier for an external resource;
transmitting a request to the external resource based on the identifier included in the targeting resource;
receiving, from the external resource, data identifying a set of endpoint addressing resources, each endpoint addressing resource from the set of endpoint addressing resources specifying a communication address and a communication channel identifier;
executing notifications in accordance to the notification request, the configuration data of the participant binding resources of the first account of the multitenant communication platform, and the set of endpoint addressing resources received from the external resource, wherein executing the notifications comprises transmitting notifications to communication addresses over a set of different communication channels as specified by the set of endpoint addressing resources.

13. The multitenant communication platform of claim 12, the operations further comprising:

tagging at least one endpoint addressing resource with a first tag from a set of tags, wherein the data identifying the set of endpoint addressing resources includes the first tag, the method further comprising:
identifying one or more endpoint addressing resources tagged with the first tag, yielding the set of endpoint addressing resources.

14. The multitenant communication platform of claim 12, the operations further comprising:

in response to receiving the notification request, activating a fallback delivery mode option;
collecting a delivery status of an executed notification that referenced a first endpoint addressing resource from the set of endpoint addressing resources, the first endpoint addressing resources having been identified as a preferred endpoint addressing resource; and
in response to collecting the delivery status, selecting a secondary endpoint addressing resource from the set of endpoint addressing resources and transmitting at least a second notification using the secondary endpoint addressing resource.

15. The multitenant communication platform of claim 12, wherein the notification request indicates a fanout delivery mode option.

16. The multitenant communication platform of claim 12, wherein transmitting notifications to communication addresses over the set of different communication channels comprises:

transmitting an asynchronous message to a communication endpoint specified by a first endpoint addressing resource from the set of endpoint addressing resources.

17. The multitenant communication platform of claim 12, wherein transmitting notifications to communication addresses over the set of different communication channels comprises:

initializing a synchronous communication stream; and
playing a message specified in a payload property of the notification request.

18. The multitenant communication platform of claim 12, wherein the set of different communication channels comprises an SMS channel, a push notification channel, a PSTN voice channel, and a proprietary service API channel.

19. The multitenant communication platform of claim 12, wherein at least one of the set of different communication channels is a proprietary service API channel to a device endpoint.

20. A non-transitory computer-readable medium storing instructions that, when executed by one or more computer processors of a multitenant communication platform, cause the multitenant communication platform to perform operations comprising:

receiving configuration data for a set of participant binding resources of a first account of the multitenant communication platform;

receiving a notification request on behalf of the first account of the multitenant communication platform, the notification request comprising a targeting property, wherein the targeting property includes an identifier for an external resource;

transmitting a request to the external resource based on the identifier included in the targeting resource;

receiving, from the external resource, data identifying a set of endpoint addressing resources, each endpoint addressing resource from the set of endpoint addressing resources specifying a communication address and a communication channel identifier;

executing notifications in accordance to the notification request, the configuration data of the participant binding resources of the first account of the multitenant communication platform, and the set of endpoint addressing resources received from the external resource, wherein executing the notifications comprises transmitting notifications to communication addresses over a set of different communication channels as specified by the set of endpoint addressing resources.

\* \* \* \* \*